United States Patent
Arur et al.

(10) Patent No.: US 11,012,315 B2
(45) Date of Patent: May 18, 2021

(54) RETROACTIVELY DETECTING STATE CHANGE IN A NETWORK FABRIC ACROSS TIMES

(71) Applicant: Cisco Technology, Inc., San Jose, CA (US)

(72) Inventors: Raghu R. Arur, New Delhi (IN); Rachana A. Soni, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 16/510,801

(22) Filed: Jul. 12, 2019

(65) Prior Publication Data

US 2020/0382378 A1    Dec. 3, 2020

(30) Foreign Application Priority Data

May 29, 2019   (IN) .............................. 201911021243

(51) Int. Cl.
*H04L 12/24*     (2006.01)

(52) U.S. Cl.
CPC .............. *H04L 41/12* (2013.01); *H04L 41/06* (2013.01)

(58) Field of Classification Search
CPC ................................ H04L 41/12; H04L 41/06
See application file for complete search history.

(56) References Cited

U.S. PATENT DOCUMENTS

| | | | |
|---|---|---|---|
| 9,686,162 B2 | 6/2017 | Singh et al. | |
| 9,736,064 B2 | 8/2017 | Zhang et al. | |
| 9,935,831 B1 | 4/2018 | Wundsam et al. | |
| 2016/0315803 A1 | 10/2016 | Sadana et al. | |
| 2017/0317887 A1* | 11/2017 | Dwaraki | H04L 45/38 |
| 2018/0152540 A1* | 5/2018 | Niell | G06F 3/0653 |
| 2019/0222485 A1* | 7/2019 | Sethi | H04L 41/145 |

OTHER PUBLICATIONS

Arista Networks, "CloudVision Configuration Guide," CloudVision version 2018.2.0 | Oct. 30, 2018 |350 pages.
Cisco.com, "Cisco Network Assurance Engine," https://www.cisco.com/c/en/us/products/data-center-analytics/network-assurance-engine/index.html.

* cited by examiner

*Primary Examiner* — Kyaw Z Soe
(74) *Attorney, Agent, or Firm* — Patterson + Sheridan, LLP

(57) ABSTRACT

Embodiments herein describe techniques for creating a lightweight snapshot of a network fabric without having to capture snapshots at a predefined interval. Instead, the snapshot system uses a data store to capture state changes to network objects in the network fabric. Because the data store captures these state changes (along with timestamps indicating when these changes occurred), the snapshot system can retroactively generate snapshots of the network fabric at any desired time. In one embodiment, the snapshot system includes an event detector that determines when to capture snapshots. Once an event is identified by the event detector, the snapshot system can use the historical changes in the data store to retroactively generate a first snapshot to capture the overall state of the network fabric before the event and a second snapshot to capture the overall state of the network fabric after the event.

19 Claims, 7 Drawing Sheets

| SNAPSHOT 405 | |
|---|---|
| SWITCH A: | EP1, EP2 |
| SWITCH B: | EP3 |
| SDN CONTROLLER: | SUBNET1 - MOD AT TIME B |

| SNAPSHOT 410 | |
|---|---|
| SWITCH A: | EP2 |
| SWITCH B: | EP3 - MOD AT TIME S<br>ROUTE1 - MOD AT TIME R |
| SDN CONTROLLER: | SUBNET1 - MOD AT TIME B,<br>MOD AT TIME H |

RETROACTIVELY DETECTING STATE CHANGE IN A NETWORK FABRIC ACROSS TIMES

CROSS-REFERENCE TO RELATED APPLICATIONS

This application claims benefit of co-pending Indian provisional patent application Serial No. 201911021243, filed May 29, 2019. The aforementioned related patent application is herein incorporated by reference in its entirety

TECHNICAL FIELD

Embodiments presented in this disclosure generally relate to system that generates snapshots to capture a state of a network fabric at specific times

BACKGROUND

A large network fabric undergoes constant operational changes such as end points (EPs) and routes being added and deleted to network nodes and changes to configuration parameters. Whenever a network node (e.g., a virtual or physical switch) reboots because of a maintenance cycle or due to an unexpected crash, often some of the operational state is not recovered. This loss of state can lead to traffic loss or an application executing on the network node behaving abnormally. When an application starts failing it is currently difficult for a system administrator to detect and pin-point what exactly changed in the network fabric.

One current solution is to capture snapshots of the network fabric at predefined intervals which can be compared to identify changes in the network fabric. These snapshots capture the entire state of the network fabric. That is, each of the snapshots includes all the network objects for all the network nodes and their associated configurations, even if the state of a network object does not change during subsequent snapshots. Depending on how often the snapshots are captured, for large networks, generating and storing the snapshots can require significant compute resources.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
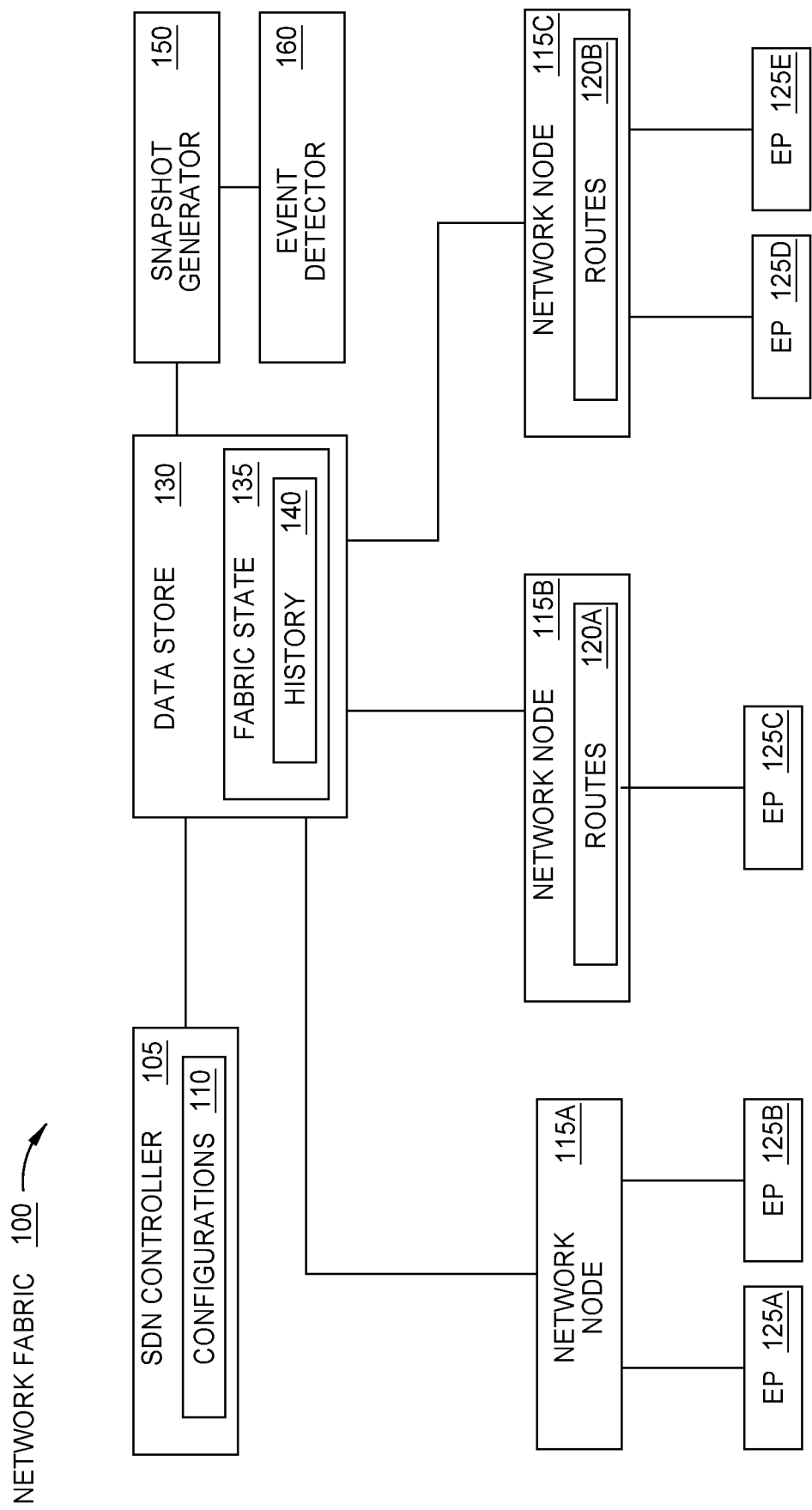
FIG. 1 is a block diagram of a system for generating snapshots of a network fabric, according to one embodiment described herein.

One embodiment presented in this disclosure is a method that includes receiving changes to network objects corresponding to a plurality of interconnected nodes forming a network fabric where the changes at least indicate when the network objects are added and deleted, storing the changes in a data store where the data store stores timestamps for each of the changes, and detecting an event occurring in the network fabric at a first time. The method also includes retroactively generating, in response to the event, a first snapshot of the network fabric based on the changes stored in the data store where the first snapshot identifies a state of the network fabric at a second time occurring before the first time and generating, in response to the event, a second snapshot of the network fabric based on the changes stored in the data store where the second snapshot identifies a state of the network fabric at a third time occurring after the first time.

Another embodiment presented in this disclosure is a computing system that includes a network fabric comprising a plurality of interconnected nodes and a data store configured to receive changes to network objects corresponding to the plurality of interconnected nodes, wherein the changes at least indicate when the network objects are added and deleted and store the changes in a data store, wherein the data store stores timestamps for each of the changes. The computing system also includes an event detector configured to detect an event occurring in the network fabric at a first time and a snapshot generator configured to retroactively generate, in response to the event, a first snapshot of the network fabric based on the changes stored in the data store where the first snapshot identifies a state of the network fabric at a second time occurring before the first time and generate, in response to the event, a second snapshot of the network fabric based on the changes stored in the data store where the second snapshot identifies a state of the network fabric at a third time occurring after the first time.

Another embodiment presented in this disclosure is a non-transitory computer-readable medium having program instructions embodied therewith, the program instructions executable by a processor to perform an operation that includes receiving changes to network objects corresponding to a plurality of interconnected nodes forming a network fabric where the changes at least indicate when the network objects are added and deleted, storing the changes in a data store where the data store stores timestamps for each of the changes, detecting an event occurring in the network fabric at a first time, retroactively generating, in response to the event, a first snapshot of the network fabric based on the changes stored in the data store where the first snapshot identifies a state of the network fabric at a second time occurring before the first time, and generating, in response to the event, a second snapshot of the network fabric based on the changes stored in the data store where the second snapshot identifies a state of the network fabric at a third time occurring after the first time.

Example Embodiments

Embodiments herein describe techniques for creating a lightweight snapshot at millisecond granularity without having to capture snapshots at a predefined interval. Instead, the snapshot system uses a data store to capture state changes to network objects in the network fabric such as adding/deleting EPs or routes, or changing configuration parameters establish by a software defined networking (SDN) controller. Because the data store captures these state changes (along with timestamps indicating when these changes occurred), the snapshot system can retroactively generate snapshots of the network fabric at any desired time with millisecond granularity. Thus, rather than storing thousands of snapshots, the snapshot system has a data store which stores the historical changes to the network objects. Using this, the snapshot system can retroactively generate a snapshot which represents the overall state of the network fabric at any previous point in time.

In one embodiment, the snapshot system includes an event detector that determines when to capture snapshots. While a user can manually instruct the snapshot system to generate a snapshot, in this example, the event detector can identify an event that is known to generate service issues in the network fabric such as a failure of a network node, software update in a network node, hardware upgrades in a network node, adding or removing of a network node, and the like. Once one of these events is identified by the event detector, the snapshot system can use the historical changes in the data store to retroactively generate a first snapshot to capture the overall state of the network fabric before the event, and a second snapshot to capture the overall state of the network fabric after the event. For example, after a network node completes a reboot process after a failure or upgrade, the snapshot system can use the data store to generate, retroactively, a first snapshot of the network fabric before the reboot and a second snapshot of the network fabric after the reboot. These snapshots can then be compared to identify changes in the network fabric which can help identify potential (or current) issues that can negatively affect the performance of the network fabric.

FIG. 1 is a block diagram of a system for generating snapshots of a network fabric 100, according to one embodiment described herein. The network fabric 100 includes a plurality of network nodes 115 that provide access for EPs 125 to a local area network (LAN) or a wide area network (WAN). In one embodiment, the network fabric 100 is a SDN network fabric which can provision, manage, and program the network nodes 115. For example, the network fabric 100 may be a network in a data center or a cloud environment.

The network nodes 115 can be any virtual or physical network device. For example, the network nodes 115 may be a switch or router, or a computing system that executes one or more virtual switches or routers. The EPs 125 can have either wired or wireless connections to the network nodes 115. The EPs 125 may be physical or virtual devices. For example, the EPs 125 may be different physical servers or one or more virtual machines (VMs) or containers that may be executed on the same physical device or multiple devices.

The SDN controller 105 may be hosted on a separate computing system or on one of the network nodes 115. In either case, the SDN controller 105 can send instructions or configurations 110 which provision, manage, and program the network nodes 115. For example, the configurations 110 can include configuration settings of an interface, one of the network nodes 115, or a subnet in the network fabric 100, creating a tenant, deploying an application, or modifying protocol properties. Moreover, EPs 125 and routes 120 can be added, removed, or modified at the network nodes 115. Thus, the interfaces, network nodes 115, subnets, tenants in the fabric 100, ports, subnets, protocol properties, EPs, and routes 120 are referred to generally as network objects. However, this is not an exclusive list and a network object can include any network object where changes to that object (e.g., adding the network object, deleting/removing the network object, or modifying the network) can be tracked.

As shown in FIG. 1, the SDN controller 105 and the network nodes 115 are communicatively coupled to a data store 130. The SDN controller 105 and the network nodes 115 forward any change to a network object to the data store 130. For example, when an EP 125 is added (i.e., connected) to a network node 115, the network node 115 transmits a notification to the data store 130. In another example, when the SDN controller 105 modifies a subnet in the fabric 100, the controller 105 can transmit information about that update to the data store 130.

Using the network object changes received from the SDN controller 105 and network nodes 115, the data store 130 can define a state 135 of the network fabric 100. In one embodiment, the fabric state 135 is defined by a plurality of entries for the network objects which indicate the changes to these objects and timestamps indicating when those changes occurred. The data store 130 is a persistent data store which can store a history 140 of the changes to the network objects. For example, even when an EP 125 is deleted or removed from a network node 115, the data store 130 may still maintain an entry for the EP 125. Similarly, if the SDN controller 105 modifies or updates a port or interface multiple times, the data store 130 can save this history 140 in the data store, rather than saving only the most recent modification or change.

Saving the history 140 of the fabric state 135 in the data store 130 permits a snapshot generator 150 to retroactively generate snapshots representing the fabric state 135 at a particular time in the past. As described in more detail below, the snapshot generator 150 can prune (or filter) the history 140 to generate a snapshot of the fabric state 135 at a time in the past with millisecond accuracy. Thus, rather than having to capture snapshots in a predefined interval (which can result in storing thousands or millions of snapshots which largely store duplicative data, especially in a stable fabric), only the data store 130 is maintained along with the history 140 which can be used to recreate a previous fabric state 135.

FIG. 1 also includes an event detector 160 which monitors the network fabric 100 to identify a predetermined event. For example, the event detector 160 may monitor the network fabric 100 to identify events that can potentially generate service issues in the network fabric such as a failure of a network node, a software update in a network node, hardware upgrades in a network node, adding or removing of a network node, network node reboots, and the like. Once an event is identified, the event detector 160 forwards this information to the snapshot generator 150 which can then use the history 140 in the data store 130 to generate a snapshot of the fabric state 135 before the event and after the event. These snapshots can then be compared (either by the snapshot generator or by the system administrator) to identify what changed in the network fabric 100 over the course of the event.

In one embodiment, the snapshot generator 150 and the event detector 160 are software applications that execute on one or more computing systems that include a processor and memory. These computing systems may be part of the network fabric 100 or external to the fabric 100. However, in another embodiment, the snapshot generator 150 and the event detector 160 are formed from hardware elements or a combination of software and hardware applications.

Figure 2:
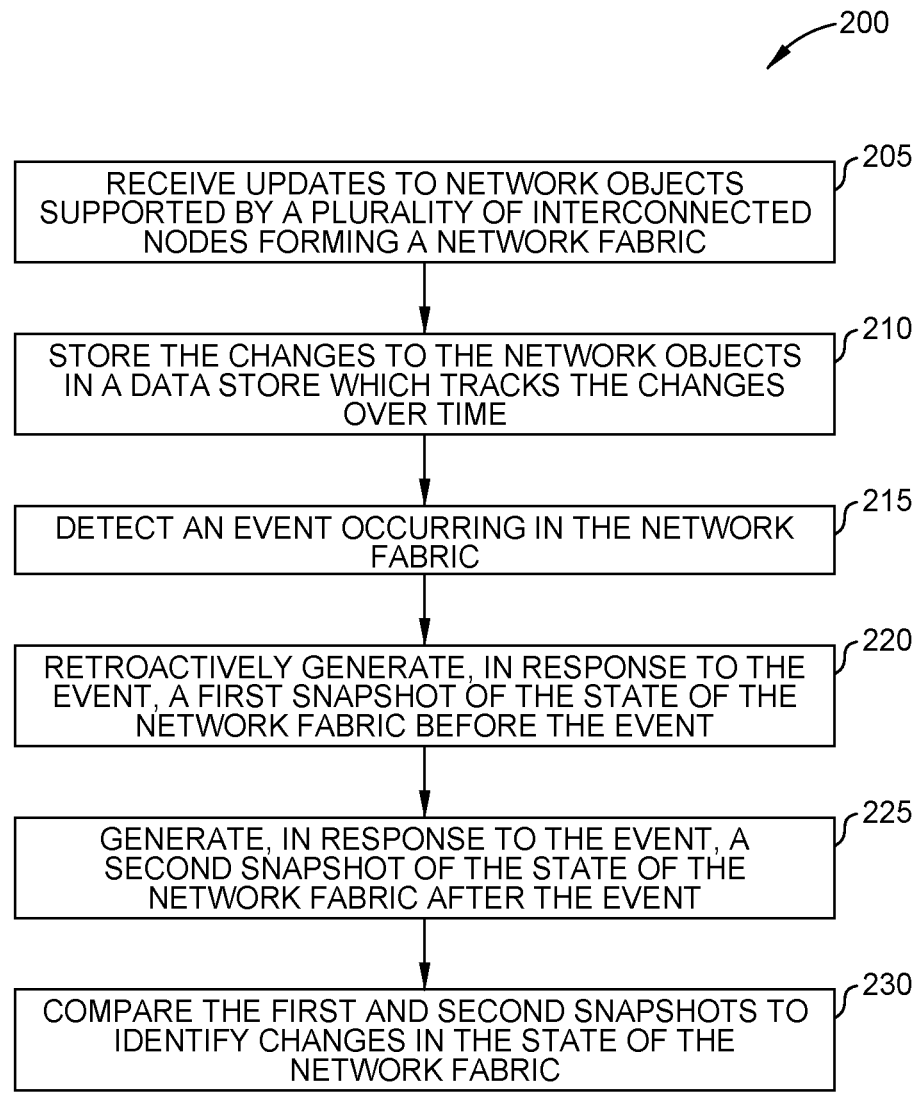
FIG. 2 is a flowchart for generating snapshots of a network fabric, according to one embodiment described herein.

FIG. 2 is a flowchart of a method 200 for generating snapshots of a network fabric, according to one embodiment described herein. At block 205, the data store receives updates to network objects supported by a plurality of interconnected nodes (e.g., the network nodes 115 in FIG. 1) that form a network fabric. As mentioned above, the network objects can include ports, interfaces, subnets, tenants, protocol properties, EPs, and the network nodes themselves. In one embodiment, these updates are provided to the data store from the nodes and/or a controller in the fabric such as a SDN controller. For example, each time a route is added, modified, or deleted, a network node sends an update to the data store. Similarly, when a controller modifies a configuration of a network object, the controller can transmit that modification to the data store.

At block 210, the data store stores the changes to the network objects and tracks the changes over time. In one embodiment, the data store saves all the changes to the network objects over time, for example, when the network objects are added, modified, and deleted. In one embodiment, the data store may store a timestamp indicating when each change to a network object occurred. The details for managing the data store are described in more detail below in FIG. 3.

At block 215, the event detector detects an event occurring in the network fabric. In one embodiment, the event detector monitors the network fabric to identify when one of a predetermined list of events occurs—e.g., failure of a network node, software update in a network node, hardware upgrades in a network node, adding or removing of a network node, network node reboots, and the like. In one embodiment, the event detector may also monitor general metrics of the network fabric (or a particular node in the fabric) such as throughput, packet drop rate, congestion, etc. If one of these metrics drop drops below a threshold performance, this could trigger an event (e.g., a route or network node drops more than 1% of its received packets).

At block 220, in response to identifying an event with the event detector, the snapshot generator retroactively generates a first snapshot of the state of the network fabric before the event. Put differently, using the history of the fabric state in the data store, the snapshot generator can effectively go back in time to determine the state of the network fabric before the event occurred. For example, if the event begin at time X (e.g., the time when a network node began to reboot or perform a software upgrade), the snapshot generator may generate a snapshot for time X-10 seconds.

Although described in more detail below, generally the snapshot includes a list of network objects in the fabric. In one embodiment, the snapshot can also include modifications made to those objects such as the different configurations of a subnet, different protocol properties, different configurations of an interface, etc. Thus, even though the number of network objects and their modifications may currently be different, using the history in the data store, the snapshot generator can create a snapshot representing the state of the fabric at a time before the event occurred.

At block 225, in response to identifying the event, the snapshot generator generates a second snapshot of the state of the network fabric after the event. For example, the snapshot generator may determine the current state of the network fabric. However, in another example, the second snapshot may also be a retroactive snapshot of the past state of the network fabric. That is, rather than generating a snapshot representing the current state of the network fabric, the second snapshot can represent the fabric state ten seconds after the event completed (which may be in the past relative to the current time).

At block 230, the snapshot generator compares the first and second snapshots to identify changes in the state of the network fabric. That is, by performing a diff (or compae) operation, the snapshot generator may determine that a EP that was previously connected to a network node (which was rebooted) is now no longer connected to the network node, or that an interface or port of the network node now has a different configuration following the reboot, which may negatively impact an application or service executing on the network node. By identifying the different network objects, or different configurations of the network objects, using the snapshots, the snapshot generator can provide information to the system administrator which may help prevent or solve a performance issue in the network fabric.

Figure 3:
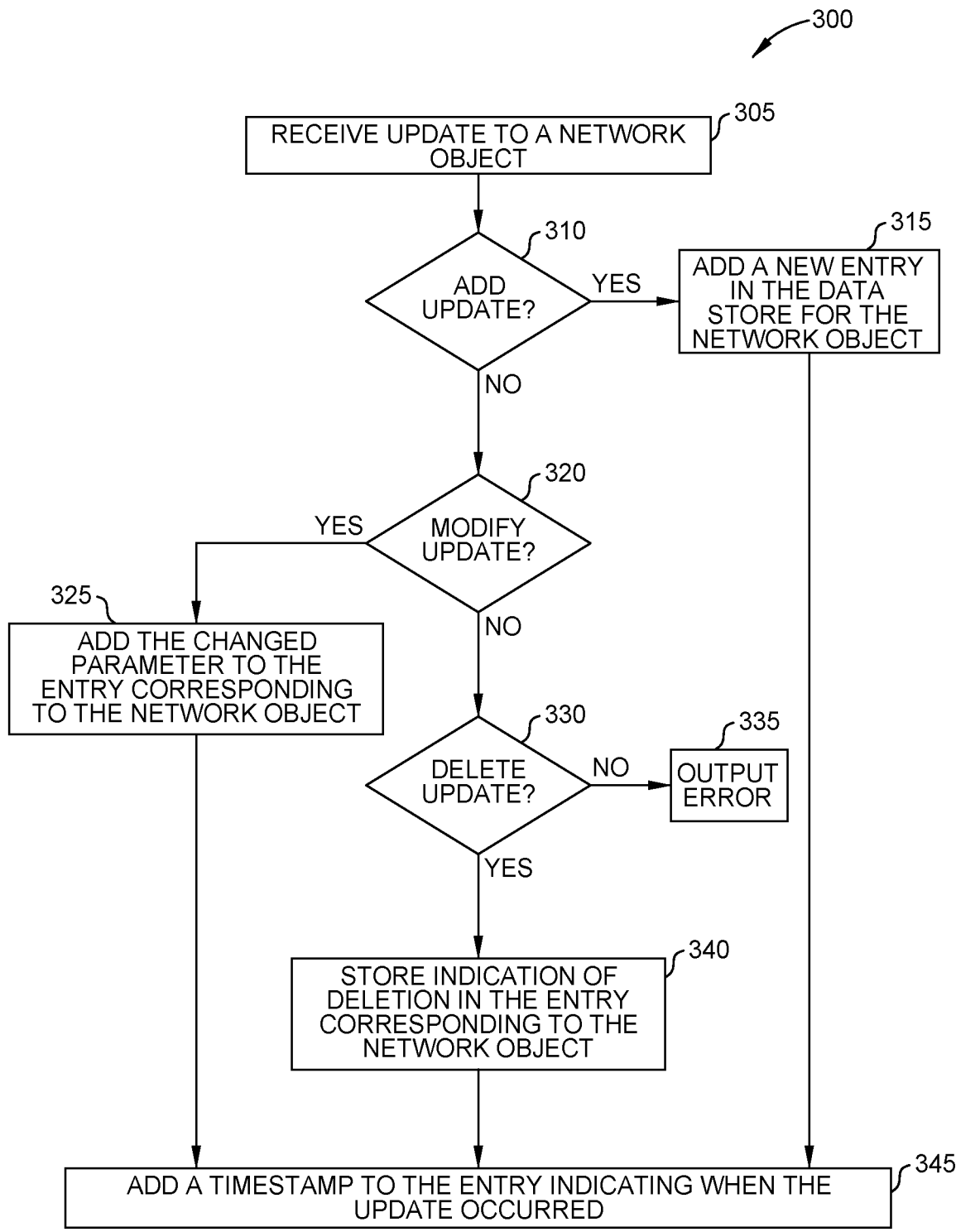
FIG. 3 is a flowchart for storing state changes of network objects in the network fabric, according to one embodiment described herein.

FIG. 3 is a flowchart of a method 300 for storing state changes of network objects in the network fabric, according to one embodiment described herein. The method 300 describes one technique for storing the changes to the network objects at block 210 of FIG. 2. For illustration, the method 300 is discussed in parallel with FIG. 4 which illustrates state changes in network objects over time, according to one embodiment described herein. Moreover, the method 300 is also discussed in parallel with FIG. 5 which illustrates entries in a data store for storing changes to network objects, according to one embodiment described herein.

At block 305, the data store receives an update to a network object. As mentioned above, the network object can be a parameter, an EP, an interface, a port, a subnet, a route, etc. The update can be provided by a network node (e.g., a switch) or a SDN controller.

Figure 4:
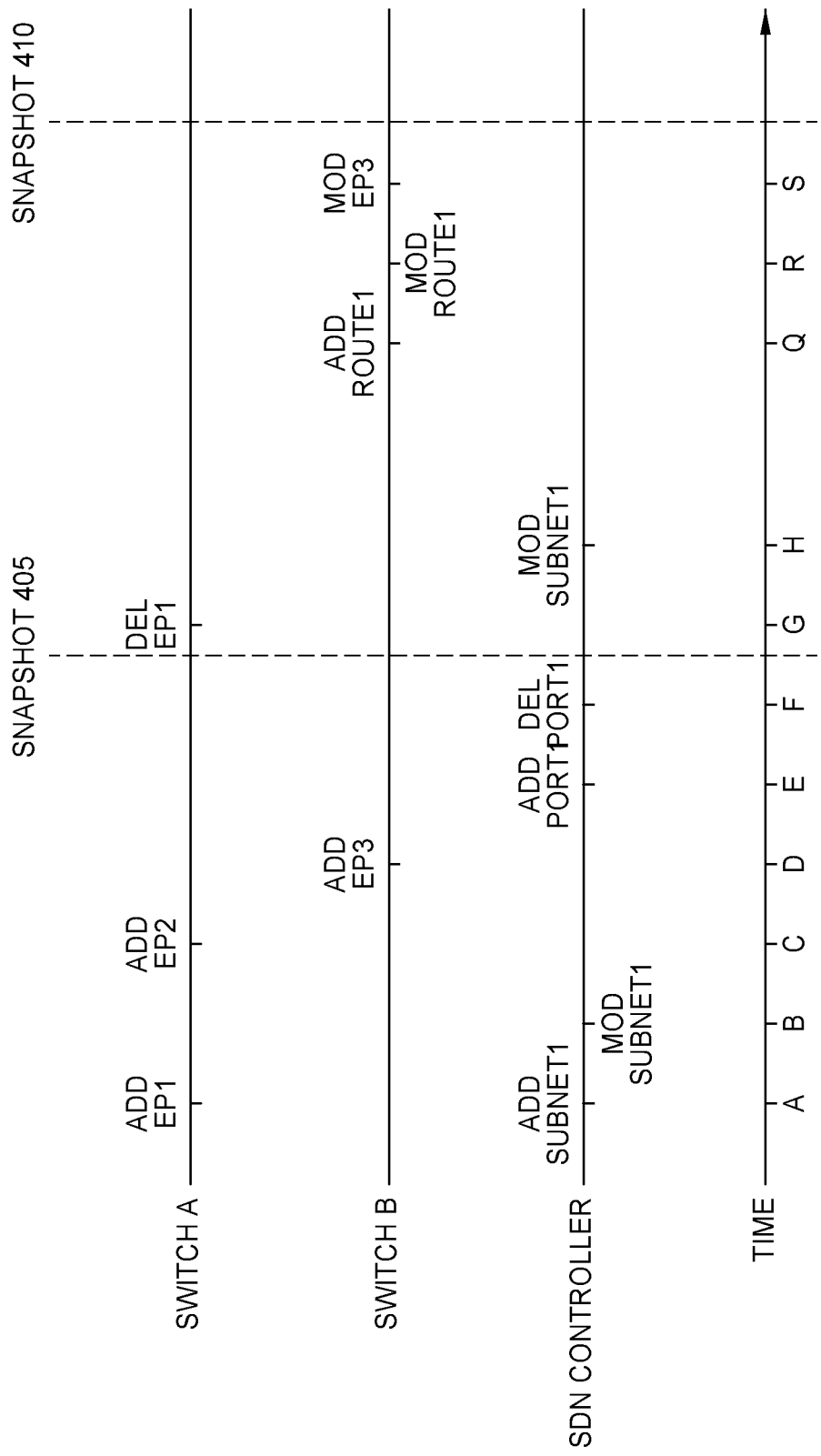
FIG. 4 illustrates state changes in network objects over time, according to one embodiment described herein.

At block 310, the data store determines whether the update is an add update. If so, the method 300 proceeds to block 315 where the data store adds a new entry for the network object. For example, FIG. 4 illustrates two add updates at Time A where the EP1 and Subnet1 are added by the Switch A and the SDN controller, respectively. FIG. 4 also illustrates add updates that occur at Time C where EP2 is added to Switch A, Time D where EP3 is added to Switch B, Time E where Port1 is established by the SDN controller, and Time Q where Route1 is established on Switch B.

Figure 5:
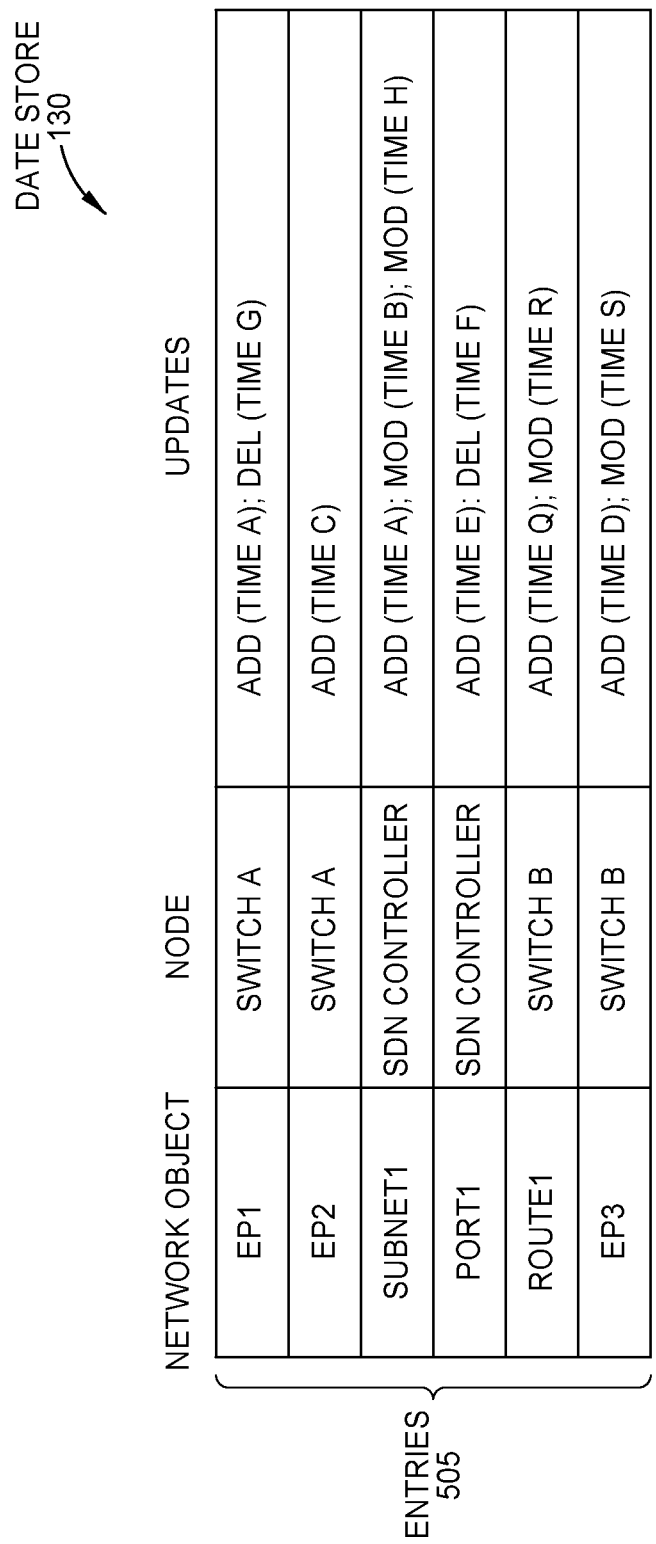
FIG. 5 illustrates entries in a data store for storing changes to network objects, according to one embodiment described herein.

In response to receiving a notification of these add updates, the data store can add an entry for these new network objects. For example, FIG. 5 illustrates a data store 130 that has entries 505 corresponding to the network objects that are modified in the FIG. 4. For example, the type or name of the network object is listed under the leftmost column, the node that added or established the network object is listed in the middle column (e.g., a switch or the SDN controller), and the various updates occurring to that network object are stored in the rightmost column. That is, the rightmost column stores a history corresponding to each of the network objects. However, the arrangement of data as shown in FIG. 5 is for illustration purposes and is not intended to illustrate the only way for storing the history corresponding to the network objects in the data store.

Returning to the method 300, assuming the update was not an add update, the method 300 proceeds to block 320 to determine whether the update is a modify update. If so, the method proceeds to block 325 where the data store adds the changed parameter in the modify update to the entry corresponding to the network object. For example, FIG. 4 illustrates a modify (MOD) update occurring for Subnet1 at Time B, another modify update occurring for Subnet1 at Time H, a modify update to Route1 at Time R, and a modify update to EP3 at Time S. In general, a modify update can be any update which changes an operational or configuration parameter of a network object.

The data store 130 in FIG. 5 saves the modify updates occurring in FIG. 4 in the entries 505. That is, the entry for Subnet1 lists both modify updates occurring at Time B and Time H, the entry for Route1 lists the modify update at Time R, and the entry for EP3 lists the modify update at Time S. In addition to storing an indication that the modify updates occurred, the data store can include the new value of the changed parameter. That is, when reporting a modify update to the data store, the node can provide the value (or values) of the parameter being changed by the update. As such, the data store 130 can store a history of values of a particular parameter. For example, the first modify update for the Subnet1 may have changed a parameter to a value of "0" but the second modify update may have changed that same parameter to a value of "1". This history can be tracked in the data store 130.

Returning to the method 300, assuming the update was not a modify update, the method 300 proceeds to block 330 where the data store determines whether the update is a delete update indicating that the network object was deleted or removed from a node (or by a node). If so, the method proceeds to block 340 where the data store stores an indication of deletion in the entry corresponding to the network object. For example, FIG. 4 illustrates a delete (DEL) update at Time F where the SDN controller deletes (e.g., or disables) the Port1 and at Time G where Switch A deletes (e.g., no longer detects) EP1. These deletions are stored in the corresponding entries 505 in FIG. 5.

If the received update is not an add, modify, or delete update, the method 300 proceeds to block 335 which is a catchall if an update is improper or corrupted. The data store may output an error to the node transmitting the command which enables the node to try to send the update again, or can forward the error to a system administrator.

At block 345, the data store adds a timestamp to the entry indicating when the update occurred. As shown in FIG. 5, each update in the rightmost column includes a corresponding timestamp (e.g., Time A, Time B, etc.) indicating when the update occurred in the network fabric. This information can then be used to create the snapshots 405 and 410 in FIG. 4 as discussed below.

Figure 6:
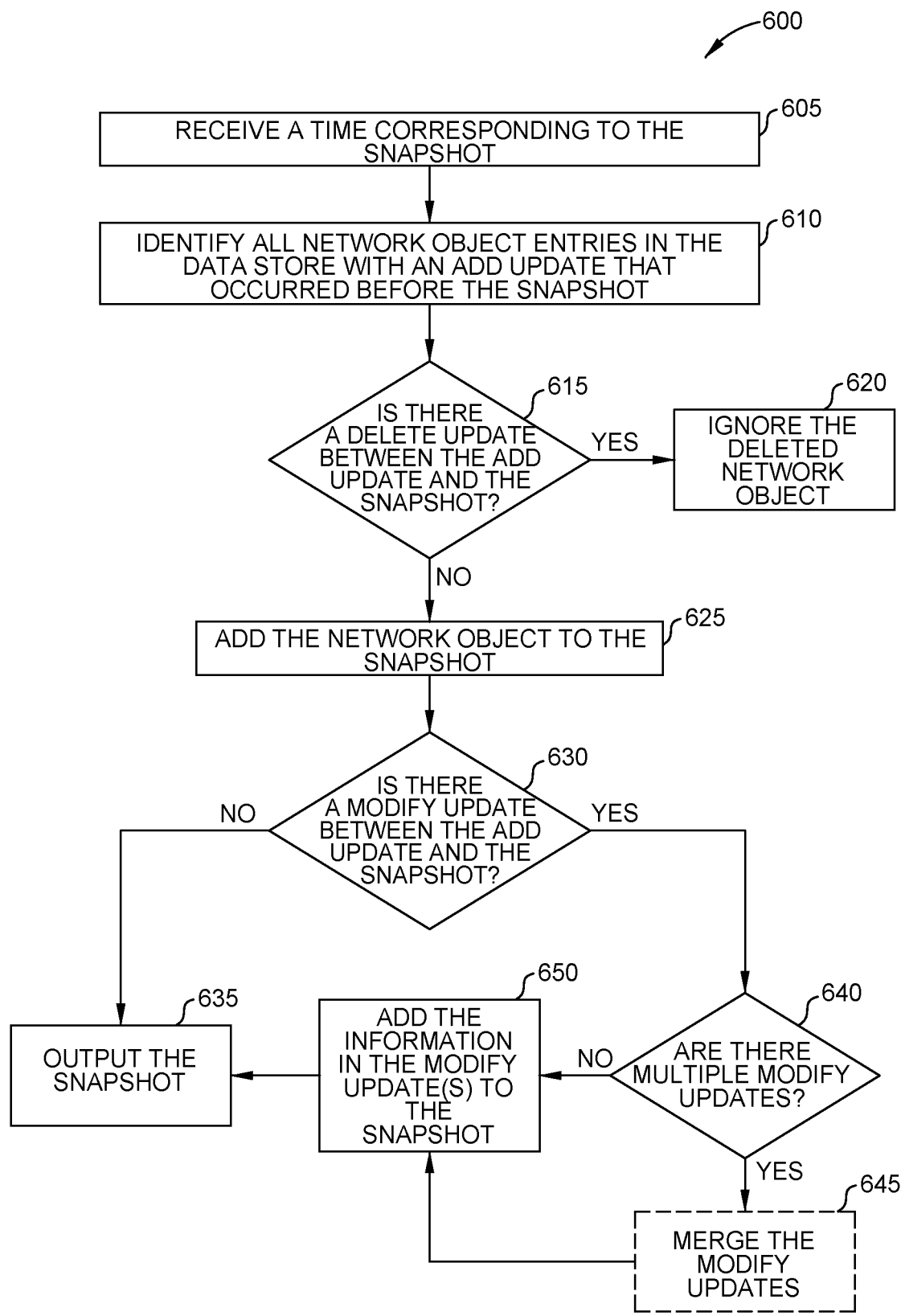
FIG. 6 is a flowchart for capturing a snapshot of a network fabric, according to one embodiment described herein.

FIG. 6 is a flowchart of a method 600 for capturing a snapshot of a network fabric, according to one embodiment described herein. For ease of explanation, the method 600 is discussed in tandem with the updates illustrated in FIG. 4.

At block 605, the snapshot generator receives a time corresponding to the snapshot. For example, the event generator may identify an event as described in block 215 and then provide to the snapshot generator instructions to retroactively generate the snapshot of the state of the network fabric at a time before the event, as well as a snapshot of the fabric state at a time following the event.

In another embodiment, the snapshot generator receives a request from system administrator. For example, the administrator may have noticed an abnormality or performance issue in the network fabric and instructs the snapshot generator to capture a snapshot before the abnormality or performance issue begin to be compared to a snapshot of the current fabric state.

At block 610, the snapshot generator identifies all network objects entries in the data store with an add update that occurred before the snapshot. Using the snapshot 405 in FIG. 4 as an example, the snapshot generator identifies network objects EP1, EP2, EP3, Subnet1, and Port1 since the network objects were added before the time corresponding to the snapshot 405. In contrast, if the snapshot generator where generating a snapshot at the time of the snapshot 410, this list would include all the same network objects but would also include Route1 since it was added between the times of the snapshots 405 and 410.

Blocks 615-650 describe a process for individually evaluating the network objects identified at block 610 to determine whether the network objects should be added to the snapshot. As such, the blocks 615-650 are repeated for each identified network object to determine whether those objects should be included in the snapshot.

At block 615, the snapshot generator determines whether there is a delete update that occurred between the add update and the snapshot by referencing the update history stored in the data store. For the snapshot 405, there is a delete update for Port1 that occurred before the time corresponding to the snapshot 405. As such, the method 600 proceeds to block 620 where the snapshot generator ignores the deleted network object. Put differently, the deleted network object is not included in the snapshot 405. For the snapshot 410, because both Port1 and EP1 were deleted, both of these network objects would not be in the snapshot 410.

Assuming the network object was not deleted before the time corresponding to the snapshot, the method 600 proceeds to block 625 where the object is added to the snapshot. For example, the entry in the data store corresponding to the network object may be used to form a corresponding entry in a data structure of the snapshot.

At block 630, the snapshot generator determines whether there is a modify update between the add update and the time corresponding to the snapshot. For example, for Subnet 1 in FIG. 4, it was modified at Time B and at time H. Thus, if generating the snapshot 405, the snapshot generator includes the modify update at Time B but not the modify update at time H. However, if generating the snapshot 410, the snapshot generator includes both of the modify updates for Subnet1 in the snapshot 410.

At block 640, the snapshot generator determines whether there are multiple modifies that occurred to the network object in the timeframe described in block 630. For example, for the snapshot 405, the Subnet1 was only modified once, thus, the method 600 proceeds to block 650. However, for the snapshot 410, the Subnet1 was modified twice, and thus, the method 600 proceeds to block 645.

Block 645 is shown in hashing since it is an optional block where the snapshot generator merges the multiple modify updates for the network object. For example, rather than showing two separate modify updates in the snapshot, the snapshot generator may list the changes sequential (without any timestamps) to show how a parameter of the network object changed since it was added. However, in another embodiment, rather than including all the modify updates in the snapshot in a merged fashion, the snapshot generator may only add the most recent modify update to the snapshot.

For example, for the snapshot 410, rather than listing that a configuration parameter of the Subnet1 was changed from "0" at Time B to "1" at Time H, the snapshot generator may only add the value "1" to the snapshot to indicate the current value of the parameters of the Subnet1 at the time of the snapshot 410.

At block 650, the snapshot generator adds the information in the modify update (or updates) to the snapshot. As mentioned above, the values of the changed parameters can be placed in the data structure of the snapshot. Moreover, the modify updated may indicate different parameters corresponding to the network object have been modified. For example, the modify update of the Subnet1 at Time B may change a different parameter of the Subnet1 than the modify update occurring at Time H. Both of these changes may be in the snapshot along with an indication that they affected different parameters of the network object.

At block 635, the snapshot generator outputs the snapshot. In one embodiment, the method 600 may repeat to generate, retroactively, two snapshots at two different times (e.g., before and after an event). These snapshots can then be compared as described above to identify differences in the states of the fabric that may identify performance issues in the fabric.

Figures 7, 8:
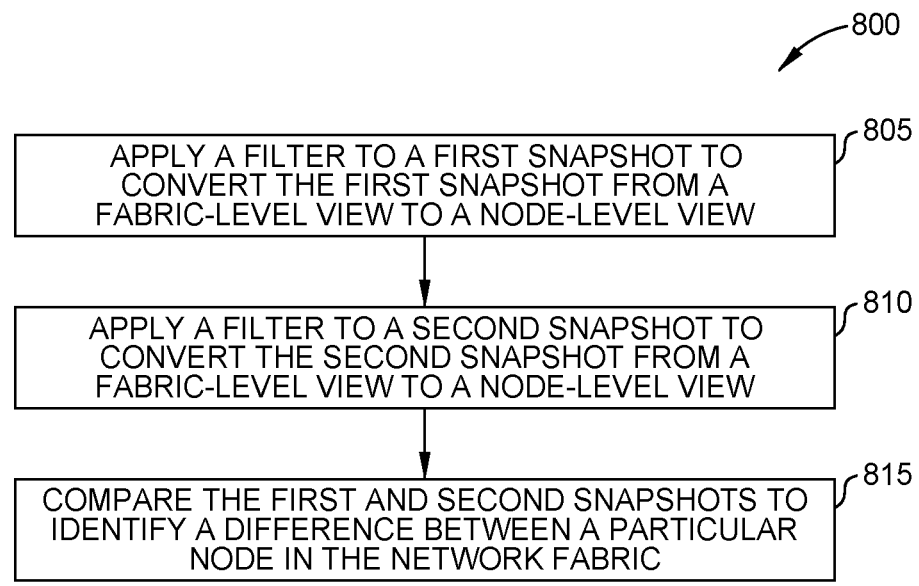
FIG. 7 illustrates two snapshots of a network fabric, according to one embodiment described herein.
FIG. 8 is a flowchart for filtering snapshots from a fabric-view to a node-view, according to one embodiment described herein.

FIG. 7 illustrates two snapshots of a network fabric, according to one embodiment described herein. Specifically, FIG. 7 illustrates data structures for the snapshot 405 and 410 illustrated in FIG. 4 which were generated using the data store 130 illustrated in FIG. 5 and the method 600 in FIG. 6.

As shown, the snapshots 405 and 410 include entries for each of the nodes that provided updates in FIG. 4—i.e., Switch A, Switch B, and the SDN controller. In snapshot 405, the entry for Switch A includes EP1 and EP2 which indicate these EPs where added to the Switch A and have not yet been deleted. In contrast, snapshot 410 indicates that only EP2 was added to the Switch A since between the times of the snapshot 405 and 410, EP1 was removed (or deleted) from Switch A.

The entry for Switch B in the snapshot 405 indicates that EP3 is currently connected to the switch. This is the same for the snapshot 410 except that this snapshot also indicates that the EP3 was modified at Time S. Although not shown, the snapshot 410 may also indicate the parameter in EP3 that was modified as well as its value. Further, the snapshot 410 indicates that Route1 was added to the Switch B and it was modified at Time R. Again, the snapshot 410 can include the parameter in the Route1 that was modified as well as its value.

The entry for the SDN controller in the snapshot 405 indicates that the Subnet1 was established by the controller and was modified at Time B. In the snapshot 410, it includes the same information but also includes information regarding the modify update that occurred during Time H. However, while FIG. 7 illustrates listing all the modifications that occurred between when a network object was added and the time of the snapshot, in other embodiments, the snapshot may list one the most recent change (relative to the time of the snapshot) to a parameter of a network object rather than multiple changes to that parameter.

FIG. 8 is a flowchart of a method 800 for filtering snapshots from a fabric-view to a node-view, according to one embodiment described herein. In one embodiment, the method 800 is performed after the method 600 is used to generate to snapshots of the fabric state at two different time periods.

At block 805, the system administrator or the snapshot generator applies a filter to a first snapshot to convert the first snapshot from a fabric-level view to a node-level view. For example, the first snapshot can include state information for network objects on multiple network nodes (or all of the network nodes) in the network fabric which define the fabric-level view. However, the system administrator or the snapshot generator may want to evaluate the states of the network object associated with a particular network node in the fabric (e.g., a particular switch or only the SDN controller). For example, the snapshots may have been triggered because a particular switch rebooted. To identify performance issues that may have occurred because of the event, the snapshot can be filtered at block 805 to include only the network objects corresponding to the rebooted node. Thus, at block 805, the filter can remove or hide the network objects that are part of the remaining network nodes to leave only the state information for the network objects corresponding to the network node of interest.

At block 810, the system administrator or the snapshot generator applies a filter to a second snapshot to convert the second snapshot from a fabric-level view to a node-level view. In this case, both the first and second snapshots include state information for only the network objects corresponding to the same node while the state information for the other network objects is removed or hidden.

At block 815, the snapshot generator compares the first and second snapshots to identify a difference between a particular node in the network fabric. Evaluating the node-level view may help to identify specific issues with a node rather than evaluating changes in the network fabric as a whole. Moreover, the snapshot generator can repeat method 800 for different nodes using the same two snapshots—e.g., different filters can be applied so that other network objects in other nodes can be compared at a node-level. Thus, to compare different nodes at the node-level, the snapshot generator does not need to generate new snapshots.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product.

Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
receiving changes to network objects corresponding to a plurality of interconnected nodes forming a network fabric, wherein the changes at least indicate when the network objects are added and deleted;
storing the changes in a data store, wherein the data store stores timestamps for each of the changes;
detecting an event occurring in the network fabric at a first time;
retroactively generating, in response to the event, a first snapshot of the network fabric based on the changes stored in the data store, wherein the first snapshot identifies a state of the network fabric at a second time occurring before the first time; and
generating, in response to the event, a second snapshot of the network fabric based on the changes stored in the data store, wherein the second snapshot identifies a state of the network fabric at a third time occurring after the first time.

2. The method of claim 1, wherein retroactively generating the first snapshot comprises:
identifying, based on the timestamps in the data store, an add update for each of the network objects that occurred before the second time corresponding to the first snapshot;
identifying, based on the timestamps in the data store, a delete update for a first network object of the network objects which occurred after a corresponding add update and before the second time corresponding to the first snapshot, wherein the first network object is not added to the first snapshot; and adding to the first snapshot a subset of the network objects that have add updates occurring before the second time of the first snapshot and do not have delete updates occurring between the add update and the second time of the first snapshot.

3. The method of claim 2, wherein retroactively generating the first snapshot comprises:

identifying a plurality of modify updates for a second network object of the subset of the network objects that occurs between a corresponding add update and the second time corresponding to the first snapshot;

merging the plurality of modify updates; and adding the merged updates to the first snapshot.

4. The method of claim 2, wherein retroactively generating the first snapshot comprises:

identifying a plurality of modify updates for a second network object of the subset of the network objects that occurs between a corresponding add update and the second time corresponding to the first snapshot; and identifying a most recent modify update of the plurality of modify updates that is closest to the second time corresponding to the first snapshot; and adding the most recent modify update to the first snapshot and ignoring the remaining modify updates of the plurality of modify updates.

5. The method of claim 1, wherein receiving the changes to the network objects corresponding to the plurality of interconnected nodes comprises:

receiving add updates, delete updates, and modify updates for the network objects, wherein the add updates indicate when the network objects begin being supported by the plurality of interconnected nodes, the delete updates indicate when the network objects no longer are supported by the plurality of interconnected nodes, and the modify updates indicate when the network objects where modified.

6. The method of claim 1, wherein receiving the changes to the network objects corresponding to the plurality of interconnected nodes further comprises:

receiving configuration changes implemented by a software defined networking (SDN) controller, wherein the configuration changes indicate when the SDN controller added or deleted the network objects.

7. The method of claim 1, further comprising:

applying a filter to the first snapshot and the second snapshot to change a view from fabric-level to a node-level; and comparing, after applying the filter, the first and second snapshots to identify differences in an operational state of a single node of the plurality of interconnected nodes.

8. The method of claim 1, wherein the plurality of interconnected nodes comprises a plurality of switches, wherein the event that triggers the generation of the first and second snapshots is a reboot in one of the plurality of switches.

9. A computing system, comprising:

a network fabric comprising a plurality of interconnected nodes;

a data store configured to:

receive changes to network objects corresponding to the plurality of interconnected nodes, wherein the changes at least indicate when the network objects are added and deleted, and store the changes in the data store, wherein the data store stores timestamps for each of the changes;

an event detector configured to detect an event occurring in the network fabric at a first time; and a snapshot generator configured to:

retroactively generate, in response to the event, a first snapshot of the network fabric based on the changes stored in the data store, wherein the first snapshot identifies a state of the network fabric at a second time occurring before the first time, and generate, in response to the event, a second snapshot of the network fabric based on the changes stored in the data store, wherein the second snapshot identifies a state of the network fabric at a third time occurring after the first time.

10. The computing system of claim 9, wherein retroactively generating the first snapshot further comprises:

identifying, based on the timestamps in the data store, an add update for each of the network objects that occurred before the second time corresponding to the first snapshot;

identifying, based on the timestamps in the data store, a delete update for a first network object of the network objects which occurred after a corresponding add update and before the second time corresponding to the first snapshot, wherein the first network object is not added to the first snapshot; and adding to the first snapshot a subset of the network objects that have add updates occurring before the second time of the first snapshot and do not have delete updates occurring between the add update and the second time of the first snapshot.

11. The computing system of claim 10, wherein retroactively generating the first snapshot further comprises:

identifying a plurality of modify updates for a second network object of the subset of the network objects that occurs between a corresponding add update and the second time corresponding to the first snapshot;

merging the plurality of modify updates; and adding the merged updates to the first snapshot.

12. The computing system of claim 10, wherein retroactively generating the first snapshot further comprises:

identifying a plurality of modify updates for a second network object of the subset of the network objects that occurs between a corresponding add update and the second time corresponding to the first snapshot; and identifying a most recent modify update of the plurality of modify updates that is closest to the second time corresponding to the first snapshot; and adding the most recent modify update to the first snapshot and ignore the remaining modify updates of the plurality of modify updates.

13. The computing system of claim 9, further comprising:

a SDN controller configured to manage the plurality of interconnected nodes and provide at least some of the changes to the data store.

14. A non-transitory computer-readable medium having program instructions embodied therewith, the program instructions executable by a processor to perform an operation, the operation comprising:

receiving changes to network objects corresponding to a plurality of interconnected nodes forming a network fabric, wherein the changes at least indicate when the network objects are added and deleted;

storing the changes in a data store, wherein the data store stores timestamps for each of the changes;

detecting an event occurring in the network fabric at a first time;

retroactively generating, in response to the event, a first snapshot of the network fabric based on the changes stored in the data store, wherein the first snapshot identifies a state of the network fabric at a second time occurring before the first time; and generating, in response to the event, a second snapshot of the network fabric based on the changes stored in the data store, wherein the second snapshot identifies a state of the network fabric at a third time occurring after the first time.

15. The non-transitory computer-readable medium of claim 14, wherein retroactively generating the first snapshot further comprises:

identifying, based on the timestamps in the data store, an add update for each of the network objects that occurred before the second time corresponding to the first snapshot;

identifying, based on the timestamps in the data store, a delete update for a first network object of the network objects which occurred after a corresponding add update and before the second time corresponding to the first snapshot, wherein the first network object is not added to the first snapshot; and adding to the first snapshot a subset of the network objects that have add updates occurring before the second time of the first snapshot and do not have delete updates occurring between the add update and the second time of the first snapshot.

16. The non-transitory computer-readable medium of claim 15, wherein retroactively generating the first snapshot further comprises:

identifying a plurality of modify updates for a second network object of the subset of the network objects that occurs between a corresponding add update and the second time corresponding to the first snapshot;

merging the plurality of modify updates; and adding the merged updates to the first snapshot.

17. The non-transitory computer-readable medium of claim 15, wherein retroactively generating the first snapshot further comprises:

identifying a plurality of modify updates for a second network object of the subset of the network objects that occurs between a corresponding add update and the second time corresponding to the first snapshot; and identifying a most recent modify update of the plurality of modify updates that is closest to the second time corresponding to the first snapshot; and adding the most recent modify update to the first snapshot and ignoring the remaining modify updates of the plurality of modify updates.

18. The non-transitory computer-readable medium of claim 15, wherein the operation further comprises:

applying a filter to the first snapshot and the second snapshot to change a view from fabric-level to a node-level; and comparing, after applying the filter, the first and second snapshots to identify differences in an operational state of a single node of the plurality of interconnected nodes.

19. The non-transitory computer-readable medium of claim 15, wherein receiving the changes to the network objects corresponding to the plurality of interconnected nodes further comprises:

receiving configuration changes implemented by a SDN controller, wherein the configuration changes indicate when the SDN controller added or deleted the network objects.

\* \* \* \* \*